May 9, 1933.  W. EGGER  1,907,760
SHEET CUTTING MACHINE
Filed Dec. 13, 1930   5 Sheets-Sheet 2

Fig. 2.

Walter Egger INVENTOR
Wm. S. Pritchard ATTORNEY

Patented May 9, 1933

1,907,760

UNITED STATES PATENT OFFICE

WALTER EGGER, OF CLEVELAND, OHIO, ASSIGNOR, BY MESNE ASSIGNMENTS, TO DU PONT CELLOPHANE COMPANY, INC., OF NEW YORK, N. Y., A CORPORATION OF DELAWARE

SHEET CUTTING MACHINE

Application filed December 13, 1930. Serial No. 502,040.

This invention relates to a cutting machine and more particularly to a machine for severing sheet-like material.

In the severing of sheet-like material, such as sheets or films of regenerated cellulose there is a tendency for this material to follow the motion of the knife and become entangled in the machine without being severed. The present invention accordingly provides means for gripping those portions of the thin-sheet-like material adjacent the field of action of the cutting means whereby cleancut severance of said material is more easily effected.

The invention further provides means for automatically disposing of the severed sheets outside the field of action of the machine so as to render them available for use.

The invention also consists in certain new and original features of construction and combinations of parts hereinafter set forth and claimed.

This application is directed to subject matter similar to that described and disclosed in copending application Serial No. 467,412, filed July 12, 1930.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which:

Like reference characters denote like parts in the several figures of the drawings.

In the following description and in the claims parts will be identified by specific names for convenience, but they are intended to be as generic in their application to similar parts as the art will permit.

Figure 1:
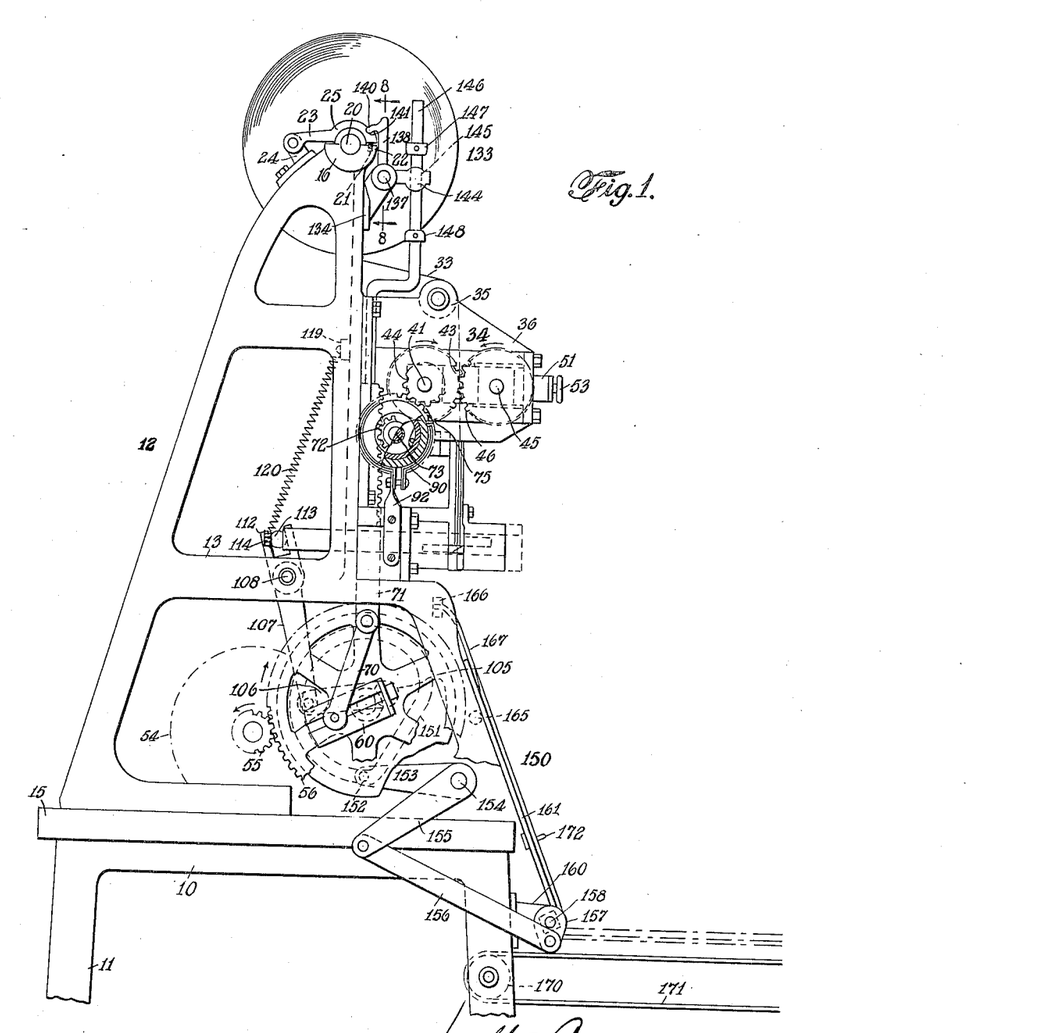
Figure 1 is a side elevation partly in section of the assembled machine.

The accompanying drawings show a concrete exemplification of the present invention and designate a table 10 (Figures 1 and 2) supported by legs 11 and surmounted by a cutting machine unit 12. The cutting machine comprises two side frame pieces 13 and 14 having the bottom portions thereof joined by a base plate 15 which rests on the table 10. The upper portions of the frame pieces 13 and 14 are provided with circularly grooved members 16 and 17 which serve as bearing blocks for a spindle 20. The bearing block 16 is provided with a bore 21 for the reception therein of a spring 22. This spring extends beyond the top surface of the member 16, as shown in Figure 1, and cooperates with an arm 23, one end of which is pivotally mounted to a bracket 24 secured to the edge of the frame piece 13. The other end of the arm 23 terminates in a bearing block 25 which serves as a companion piece for the bearing member 16.

The spindle 20 is provided on each end thereof with knurled knobs 26 (Figure 2) for facilitating the setting of the spindle 20 on its supporting bearing members 16 and 17. This spindle has also secured thereto a fixed hub 27 and a slidable hub 30, the position of which can be selectively adjusted along said spindle through the agency of an angularly disposed set-screw 31. Disposed between the hubs 27 and 30 is a roller 32 having a continuous length of sheet 33 wound therearound.

Figure 4:
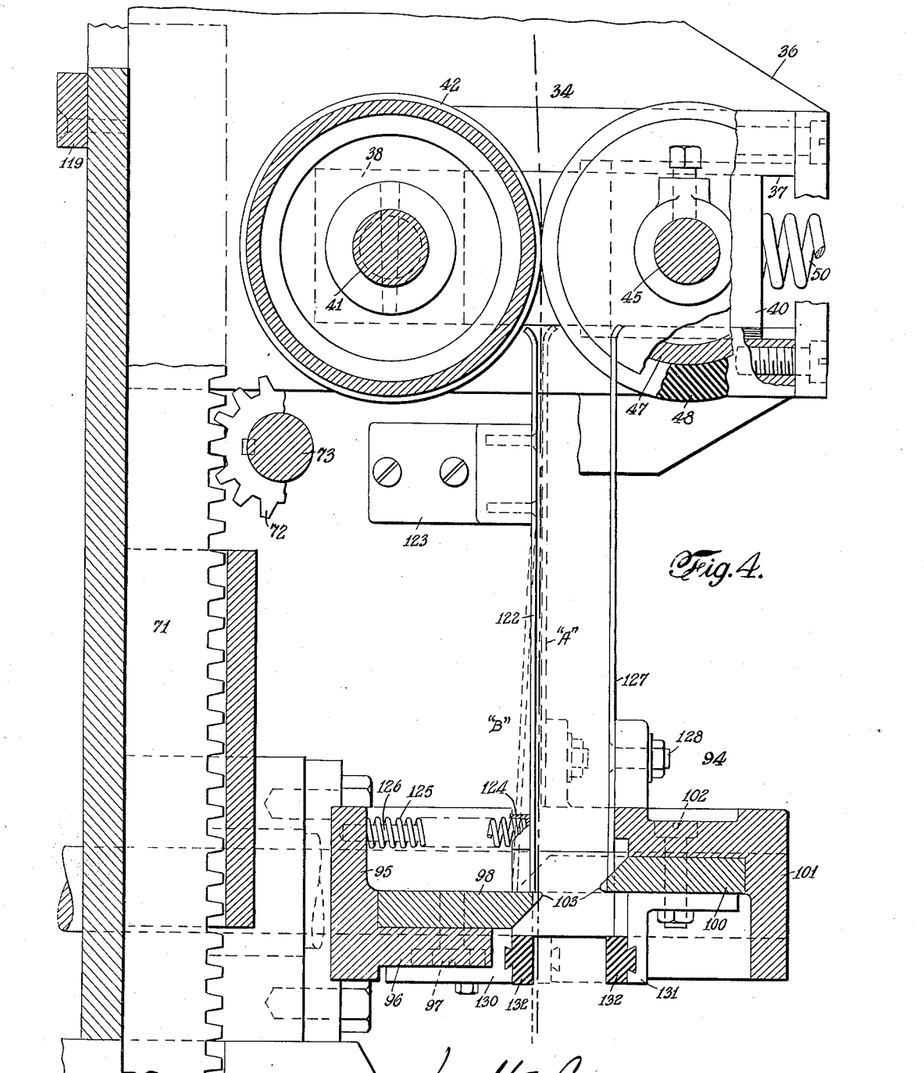
Figure 4 is a section taken on line 4—4 of Figure 3.

For advancing the web 33 into the field of action of the cutting blades hereinafter referred to, there is provided a feeding unit designated generally by the numeral 34. This unit comprises a roller 35 journaled to the auxiliary frame pieces 36, these frame pieces being secured to the frame pieces 13 and 14 respectively and being provided with rectangular slots 37, one end of each slot having fixed therein bearing blocks 38 (Figure 4). Proximate the other end of the slots 37 are slidably mounted bearing blocks 40.

Journaled in the bearing blocks 38 is a shaft 41 which has affixed thereto a roller 42. This shaft 41 extends outside one of the auxiliary frame pieces 36 and has secured to the extended portion thereof gears 43 and 44, as shown in detail in Figure 5. The bearing blocks 40 have journaled therein a shaft 45, one end of which extends beyond one of the frame pieces 36. The extended portion of the shaft 45 carries a gear 46 which meshes with the gear 43. Also mounted on the shaft 45 in equally spaced intervals are a plurality of sleeve members 47 which are pinned to this shaft and which have mounted thereon roller sheaths 48. These roller sheaths are preferably made of rubber or other yieldable material and have contacting engagement with the roller 42.

The pressure between the rollers 42 and 48 can be selectively adjusted through the agency of a coil spring 50 (Figures 1 and 5) which is disposed in a housing 51 and which has one end thereof impinging on the bearing blocks 40. The other end of the coil spring cooperates with a plate 52, the position of which is selectively adjusted by means of a thumb screw 53. A similar arrangement (not shown) is disposed on the other end of the shaft 45.

Figure 2:
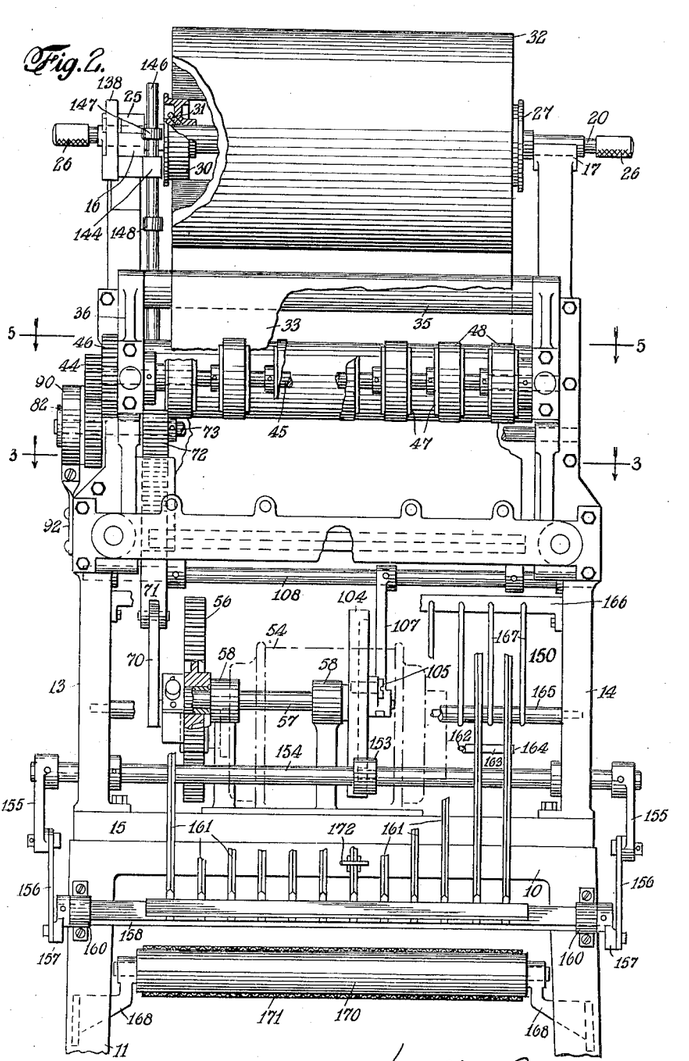
Figure 2 is a front elevation partly in section of the assembled machine.

In order to effect the rotation of the rollers 42 and 48 in the direction for feeding the web 33 into the field of action of the cutters, there is provided a main source of power which may take the form of the motor 54 (Figures 1 and 2). The shaft of this motor is provided with a pinion 55 which meshes with a spur gear 56. This gear 56 is mounted on a shaft 57 which is journaled in the bearing brackets 58.

Figures 5, 7:
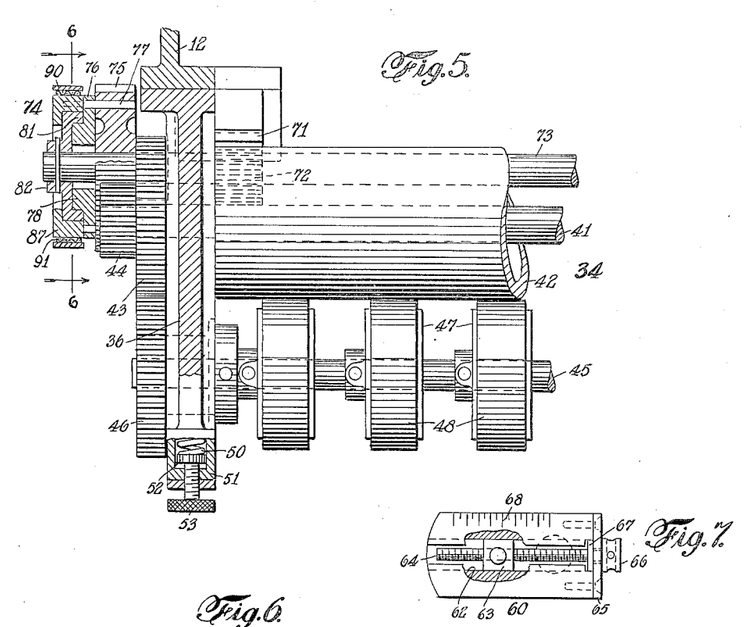
Figure 5 is a partial section taken on line 5—5 of Figure 2.
Figure 7 is a detail view of the adjusting crank unit shown in Figures 1 and 2.

Secured to the face of the gear 56 is an adjustable crank unit 60, details of which are shown in Figure 7. This unit consists of a member 61 having a T-slot 62 extending longitudinally thereof. The base of the slot 62 has slidably mounted therealong a block 63 which has a threaded engagement with a spindle 64. Mounted on one end of the member 61 is a plate 65 which is provided with a bore for the passage therethrough of the spindle 64. This spindle 64 is provided with a knob 66 and a collar 67 disposed on both sides of the plate 65 for obviating longitudinal movement of said spindle. The member 61 is also provided with engraved graduations 68 calibrated to indicate sheet lengths, as will be made apparent hereafter. By means of this arrangement, the position of the block 63 in the slot 62 can be selectively adjusted in response to the rotation of the knob 66.

Figure 6:
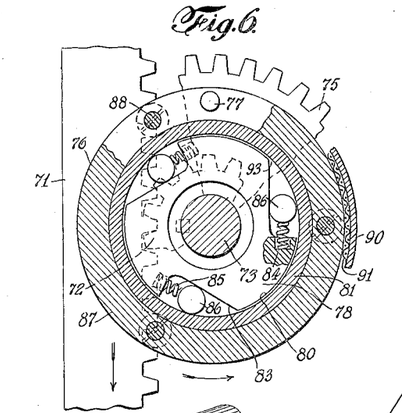
Figure 6 is a section taken on line 6—6 of Figure 5.
Figure 8:
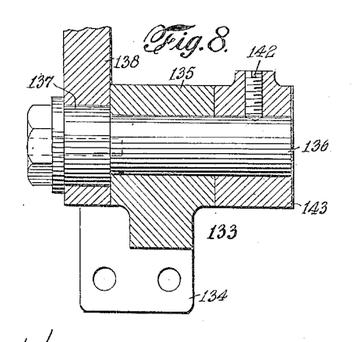
Figure 8 is a section taken on line 8—8 of Figure 1.
Figure 9:
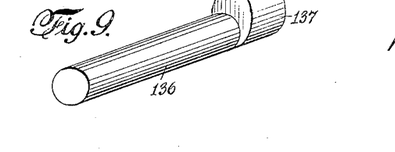
Figure 9 is a perspective showing one element of the brake unit adapted to cooperate with the web roll.

Pivotally mounted on the block 63 is one end of a pitman 70 (Figures 1 and 2), the other end of which is pivotally mounted to a suitably guided rack member 71. This rack member 71 meshes with a gear 72 fixedly mounted on a shaft 73. This shaft 73 has disposed proximate one end thereof a brake unit designated generally by the numeral 74 (Figures 5 and 6). The purpose of the brake unit is to effect the rotation of the rollers 42 and 48 in a feeding direction only as will be made apparent.

The brake unit 74 consists of a gear 75 which is loosely mounted on the shaft 73 and which meshes with the gear 44. This gear 75 is fixedly secured to a sleeve 76 by means of press-fitted pins 77. This sleeve 76 is provided with a reduced portion 78 having a cam periphery 80, as shown in Figure 6. The reduced portion 78 of the sleeve 76 is embraced by a collar 81 having a hub 82 which is pinned to the shaft 73. This collar 81 defines conjointly with the reduced portion 78 of the sleeve 76 recesses 83. The portion 78 is provided with bores 84 for the reception therein of one end of the coil springs 85, the other end of which cooperates with rollers 86 disposed in said recesses 83. Embracing the outside of the collar 81 is a flanged sleeve 87 which is secured to the sleeve 76 by means of screws 88. The outer periphery of this flanged sleeve 87 is embraced by a brake band 90, which is provided with a suitable brake lining 91 and which is secured to the frame structure of the machine by means of an integral strap 92 secured to the frame structure of the machine, as shown in Figure 1.

On the down stroke of the rack 71 in the operation of the brake unit 74, the gear 72 is rotated in a counterclockwise rotation, as seen in Figure 6. This effects a corresponding counterclockwise rotation of the collar 81. As the collar 81 rotates in this direction the rollers 86 become jammed in the apex 93 of the recesses 83. This causes the rotation of the sleeve 76 in a counterclockwise rotation and a corresponding rotation of the flanged sleeve 87 and the gear 75. The rotation of the gear 75 is transmitted to the intermeshed gear 44 which effects the rotation of the rollers 42 and 48 through the agency of the intermeshed gears 43 and 46. In this manner the rollers 42 and 48 are turned in a direction to permit the feeding of the web 33 therethrough.

Upon the up stroke of the rack 71, the collar 81 is rotated in a clockwise direction, as seen in Figure 6. Under these conditions the rollers 86 will be urged into cooperative engagement with the springs 85 which serve to dampen to a certain extent any tendency for rotating the sleeve 76 in a clockwise direction. The tendency for the sleeve 76 to rotate in this direction is further counteracted by the resistance of the brake band 90 on the flanged sleeve 87, so that the gear 75 remains stationary. It should be noted that by means of this arrangement the rollers 42 and 48 will rotate only during feeding periods thereby obviating the fouling of the web 33 during cutting periods.

For the purpose of severing the web 33, a cutting unit 94 is provided comprising a knife holder 95 (Figures 3, 4 and 5) which is fixed to the frame structure of the machine. This knife holder 95 has a horizontally extending ledge 96, on the top surface of which is secured by means of screws 97, a cutting knife 98. Cooperating with this knife 98 is a companion knife 100 which is secured to a movable knife holder 101 by means of screws 102. The cutting edge of the knives 98 and 100 are provided at one end thereof with extending portions 103 having arcuated contacting surfaces which serve to facilitate the sliding cooperation of these two knives.

Figure 3:
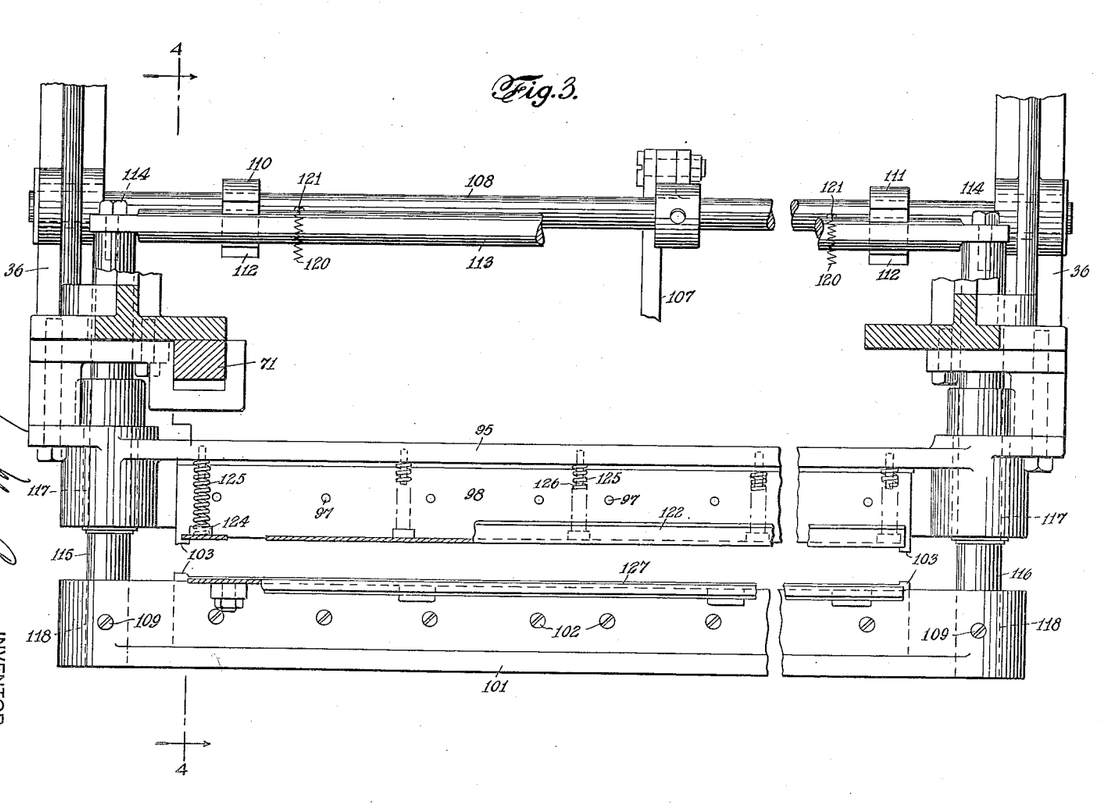
Figure 3 is a sectional plan taken on line 3—3 of Figure 2 showing the cutters in open position.

For the purpose of intermittently guiding the knife 100 into cooperative relationship with the knife 98, the shaft 57 has secured to one end thereof a box cam 104 having a transverse pin 105 which has a threaded engagement with said box cam and which is eccentrically mounted with respect to the shaft 57 (Figures 1 and 2). This pin 105 extends beyond the face surface of the cam 104 and has pivotally mounted thereon one end of a crank lever 106, the other end of which is pivotally mounted to one end of a connecting rod 107. The other end of the connecting rod 107 is pinned to a rock shaft 108 which is suitably journaled in the frame structure of the machine (Figures 1, 2 and 3). Pinned to the rock shaft 108 are two yokes 110 and 111 having forked elements 112 which embrace a rod 113. The ends of this rod 113 are flattened and have secured thereto by means of bolts 114 two mandrels 115 and 116. The fixed knife holder 95 is provided with bores 117 to permit the passage therethrough of these mandrels 115 and 116, the ends of which pass through bores 118 in the movable knife holder 101. These mandrels 115 and 116 are fixed to the knife holder 101 by means of set-screws 109. Through the instrumentality of this arrangement, the rotation of the box cam 104 causes the shaft 108 to rock between definite limits causing thereby the corresponding angular oscillation of the yokes 110 and 111. The oscillation of these yokes 110 and 111 is imparted to the mandrels 115 and 116 which effect thereby reciprocating movement of the movable knife 100 in and out of cooperative relationship with its companion knife 98.

In order to effect a more intimate contact between the knives 98 and 100 during their cutting action, retractile springs 120 are provided. These springs are secured at one end thereof to screws 121 which are threaded into the rock shaft 108. The other ends of these springs 120 are suitably attached to a bar 119 mounted on the frame structure of the machine.

For the purpose of guiding the web 33 between the knives 98 and 100 and gripping said web to permit the clean-cut severance thereof, there is provided a guide plate 122. This plate 122 is fastened to a bracket 123 secured to the frame structure of the machine and has its top edge positioned adjacent the periphery of the roller 32, as shown in Figure 4. There are provided proximate the bottom edge of the plate 122 cups 124 which receive one set of ends of springs 125, the other set of which cooperates with the knife holder 95. These springs 125 are guided in place through the agency of spindles 126 having threaded engagement with the knife holder 95. The other element of the gripping means is constituted by a plate 127 which is secured to the knife holder 101 by means of bolts 128. This plate 127 not only cooperates with the plate 122 as a guide means for the web 33 during its passage to the field of action of the cutting means but also serves as an element of the gripping means during cutting periods. During the cutting stroke, the gripping plate 127 will move into the position "A". indicated in Figure 4, causing thereby the flexing of the plate 122 under the action of the springs 125 into the position designated by the letter "B". It should be noted that during the cutting action the web is being firmly held against any possible entanglement in the machine.

Under certain conditions it may be necessary to grip the web 33 below the field of action of the knives 98 and 100 in order to effect a clean-cut severance. For this purpose, the knife holders 95 and 101 are provided with members 130 and 131, respectively, to which are secured by any suitable means gripping members 132. These gripping members are made of rubber or any other yieldable material. It should be noted that the gripping members 132 are not absolutely necessary and can be eliminated if desired.

In order to provide means for counteracting the inertial tendency of the roller 32 to continue to rotate after the feed rollers 42 and 48 have ceased their feeding functions, the bearing block 25 has cooperating therewith a brake device designated generally by the numeral 133. This brake device comprises a bracket 134 which is secured to the side of the frame piece 13 and which has a bearing block 135 associated therewith. Passing through this bearing block 135 is a rock shaft 136, one end of which has an eccentrically disposed enlargement 137. This enlargement 137 is embraced by the lower portion of an arm 138 which is arranged to serve as an eccentric sheave, said arm having a projection 140 laterally extending from the top portion thereof and interlocking with a depression 141 on the top surface of the bearing block 25. The other end of the shaft 136 has secured thereto by means of a set-screw 142 one end of an arm 143, the other end of which terminates in the globular enlargement 144, having a bore 145 therethrough for the reception of a rod 146. This rod 146 has an angular offset, as shown in Figure 1, and has the lower end thereof secured to the top end of the rack gear 71. Secured to the rod 146 are two stop members 147 and 148, each of which is arranged to cooperate with the globular enlargement 144 at the end of the strokes of the rack gear 71.

In the operation of this brake device 133, at the end of the downward stroke of the rack member 71, the stop member 147 will engage the globular enlargement 144 and rotate the shaft 136 in a clockwise direction, as seen in Figure 1. This will cause the arm 138, by means of its eccentric arrangement with respect to said shaft 136, to bear down on the bearing block 25 against the action of the spring 22. This operation serves to hold the roller 32 against continued rotational movement while the rack 71 is moving in an upward direction. It should be noted that during this upward movement of this rack 71, the rollers 42 and 48 are not functioning, so that any continued movement of said roller 32, during this particular period, will tend to foul the web 33.

When the rack 71 has reached the end of its upward stroke, the member 148 will engage the globular enlargement 144 and rotate the shaft 136 in a counterclockwise direction, as seen in Figure 1. This movement will relieve the pressure of the projection 140 on the bearing 25 and render the roller 32 free to rotate, so that on the subsequent downward stroke of the rack 71, the web 33 can be fed between the rollers 42 and 48.

In order to dispose the severed sheets of the web outside the field of action of the machine to render them available for use, there is provided a depositing unit designated generally by the numeral 150 (Figures 1 and 2). This unit consists of the box cam 104 having a cam groove 151 in which is cooperatively mounted a cam roller 152. This cam roller is pivotally mounted to one end of a lever 153, the other end of which is secured to a suitably journaled rock shaft 154. Pinned to this rock shaft 154 are the ends of a pair of levers 155, the other ends of which are pivotally mounted to one set of ends of connecting links 156. The other set of ends of these connecting links 156 are pivoted to crank arms 157 which are secured to the ends of a rock shaft 158 journaled in brackets 160. Fixedly secured to this shaft 158 by any suitable means is a plurality of rod-like elements 161 which are positioned along said shaft at equal intervals. The intermediate portions of said elements 161 are held together by means of a rod 162 passing through spacing nipples 163 and having the ends thereof threaded for the reception of bolts 164. These elements 161, during their normal inactive periods, rest against a rubber roller 165 secured to the frame pieces 13 and 14 of the machine.

Extending between the frame pieces 13 and 14 is a bar 166 (Figures 1 and 2). Depending from said bar 166 is a plurality of substantially rigid wires 167, the lower portions of which are positioned adjacent the rubber roller 165.

Secured to the legs 11 are bearing brackets 168 in which is journaled the roller 170 for guiding a conveyer belt 171. Fastened to one end of the rod-like elements 161 is a clamp 172 which serves as a detent to the downward movement of the severed sheets.

In the operation of this sheet-depositing unit 150, as soon as the web has been cut, the severed sheets gravitate along the wires 167 and the elements 161 until the bottom edges of said sheets reach the clamp 172. The various units of the machine are so coordinated that, as soon as these sheets reach the clamp 172, the elements 161 are angularly displaced into a horizontal position so as to deposit the severed sheets on the endless conveyer belt 171. The elements 161 work rapidly so that the air caught against the sheets holds them, and return just as rapidly so that the sheets once deposited will not be caught up in the vacuum created. By providing a plurality of rod-like elements 161 instead of a continuous surface, said sheets are held more effectively through the agency of the air pressure, and any possible curling or rumpling of said sheets is thereby obviated.

It should be noted that the elements 161 have triangular edges so that the severed sheets are in contact with the apex of said edges. This arrangement tends towards a more facile and effective means of depositing the severed sheets on the conveyer 171. Upon a clockwise rotation of the elements 161, as seen in Figure 1, the air will create sufficient pressure to effect cohesion between the contacting surfaces of the sheets and the elements 161. Upon the retrograde movement of the elements 161, the sheets will tend to adhere to these elements. By providing a smaller contacting surface between the sheets and the elements 161, this defect will be obviated.

In starting the machine, the roll of web-like material is placed on the spindle 20 and locked therein by means of hub members 27 and 30. The web 33 is then passed over the roller 35 and between the feed rollers 42 and 48. The web is guided in its downward movement between the plates 122 and 127 and into the field of action of the knives 98 and 100. The adjusting crank unit 60 is then regulated in response to the rotation of the knob 66 to effect any selective stroke in the rack 71. This stroke determines the length of the sheet to be severed.

As the gear 56 rotates in the direction shown in Figure 1, the rack in its downward stroke effects the rotation of the feed rollers 42 and 48 in a direction indicated in said figure. This causes the web 33 to be fed between the plates 122 and 127 and into the field of action of the knives 98 and 100. The length of the web 33 passing through the rollers 42 and 48 is determined in accordance with the adjustment of the crank unit 60, as already described.

The various units of the machine are so coordinated that by the time the rack 71 has reached the bottom of the stroke, the knife 100 has already started to move into cooperative shearing relationship with the knife 98. This movement of the knife 100 is effected through the rotation of the box cam 104 on which is mounted the transverse pin 105. The rotary movement of this transverse pin 105 is transmitted to the shaft 108 through the instrumentality of the crank lever 106 and the connecting rod 107 so as to effect a rocking movement of the shaft 108. This rocking movement of the shaft 108 is in turn imparted to the rod 113 by means of the yokes 110 and 111, so that the mandrels 115 and 116 are correspondingly reciprocated. Inasmuch as these mandrels carry the movable knife holder 101 at their ends, their reciprocating movement effects the corresponding movement of the knife 100.

When the rack has reached its lowest position, the brake device 133 serves to counteract the inertial tendency of the roller 32 to continue its rotation. Inasmuch as the feed rollers 42 and 48 are stationary during this particular step in the operation of the machine, such continued movement of the roller 32 would be highly undesirable. When the rack 71 has reached the bottom of its downward stroke, the gripping plate 127 and one of the gripping members 132 move to hold the web so that a slight continued movement of the knife 100 severs said web. This severance of the web 33 is effected during the upward stroke of the rack 71. During this upward movement, the brake unit 74 functions to idle the gear 75. This effects a resultant inactiveness in the feed rollers 42 and 48. During the continued upward movement of the rack 71 after the knife 100 has severed the sheet, this knife is retracted, releasing the gripping elements and permitting the severed sheet to gravitate along the elements 161, as already described.

As soon as the bottom of the severed sheet comes in contact with the clamp 172, the elements 161 start in their angular movement to deposit said sheet on the conveyer 171. This angular movement of the elements 161 is effected through the agency of the box cam 104 with its cooperating roller 152. These elements 161 work rapidly so that the air caught against the sheet holds it. They return just as rapidly so that the sheet once deposited will not be caught up in the vacuum created.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

I claim:

1. In a device of the class described, the combination comprising means for severing sheets, means for feeding said sheets towards the field of action of said severing means, yieldably mounted means disposed on one side of the sheet serving as an element of a guide for said sheet in its passage towards the field of action of said severing means, and a reciprocating member disposed on the other side of said sheet and cooperating at intervals with said yieldably mounted means for the purpose of gripping said sheet.

2. In a device of the class described, the combination comprising a first means for severing thin sheet-like material, a second means for feeding said material towards the field of action of said severing means, a third means resiliently mounted and disposed on one side of said material and serving as a guiding means for said material in its passage towards the field of action of said severing means, and a reciprocating member disposed on the other side of said sheet and cooperating at intervals with said third means for the purpose of gripping said sheet.

3. In a device of the class described, the combination comprising means for severing thin sheet-like material, means for feeding said material towards the field of action of said severing means, yieldably mounted means serving as a guide for one side of the material in its passage towards the field of action of said severing means, fixed means serving as companion guiding means to said yieldably mounted means and cooperating with the other side of said material, and a reciprocating member cooperating at intervals with said yieldably mounted means for the purpose of gripping said material.

4. In a device for severing thin sheet-like material, the combination comprising a spindle mounted for carrying a roll of the sheet-like material, means for intermittently feeding a predetermined length of said material, a rack member, means for reciprocating said rack within predetermined limits, means for actuating said feeding means only in response to the movement of said rack in one direction, and a brake mechanism associated with said spindle and actuated by said rack.

5. In a device for severing thin sheet-like material, the combination comprising a spindle mounted for carrying a roll of the sheet-like material, means for intermittently feeding a predetermined length of said material, a rack member, means for reciprocating said rack within predetermined limits, means for actuating said feeding means only in response to the movement of said rack in one direction, a rock arm having one end thereof cooperating with said spindle to exert a braking effect, and a reciprocating member cooperating with the other end of said rock arm, said reciprocating member being actuated by said rack.

6. In a device for severing thin sheet-like material, the combination comprising a spindle mounted for carrying a roll of the sheet-like material, means for intermittently feeding a predetermined length of said material, a rack member carrying two spaced abutments, means for reciprocating said rack within predetermined limits, means for actuating said feeding means only in response to the movement of said rack in one direction, and a brake mechanism associated with said spindle and actuated to braking and non-braking positions by said two spaced abutments.

7. In a device for severing thin sheet-like material, the combination comprising a spindle mounted for carrying a roll of the sheet-like material, means for intermittently feeding a predetermined length of said material, a rack member carrying two spaced abutments, means for reciprocating said rack within predetermined limits, means for actuating said feeding means only in response to the movement of said rack in one direction, a rock arm having one end thereof cooperating with said spindle to exert a braking effect and the other end being adapted to be engaged by said two spaced abutments to actuate the rock arm to braking and non-braking positions.

In testimony whereof, I have affixed my signature to this specification.

WALTER EGGER.